April 5, 1960 V. E. ACKLES 2,931,289
DOUGHNUT FRYING MACHINE
Filed Feb. 18, 1957 5 Sheets-Sheet 4

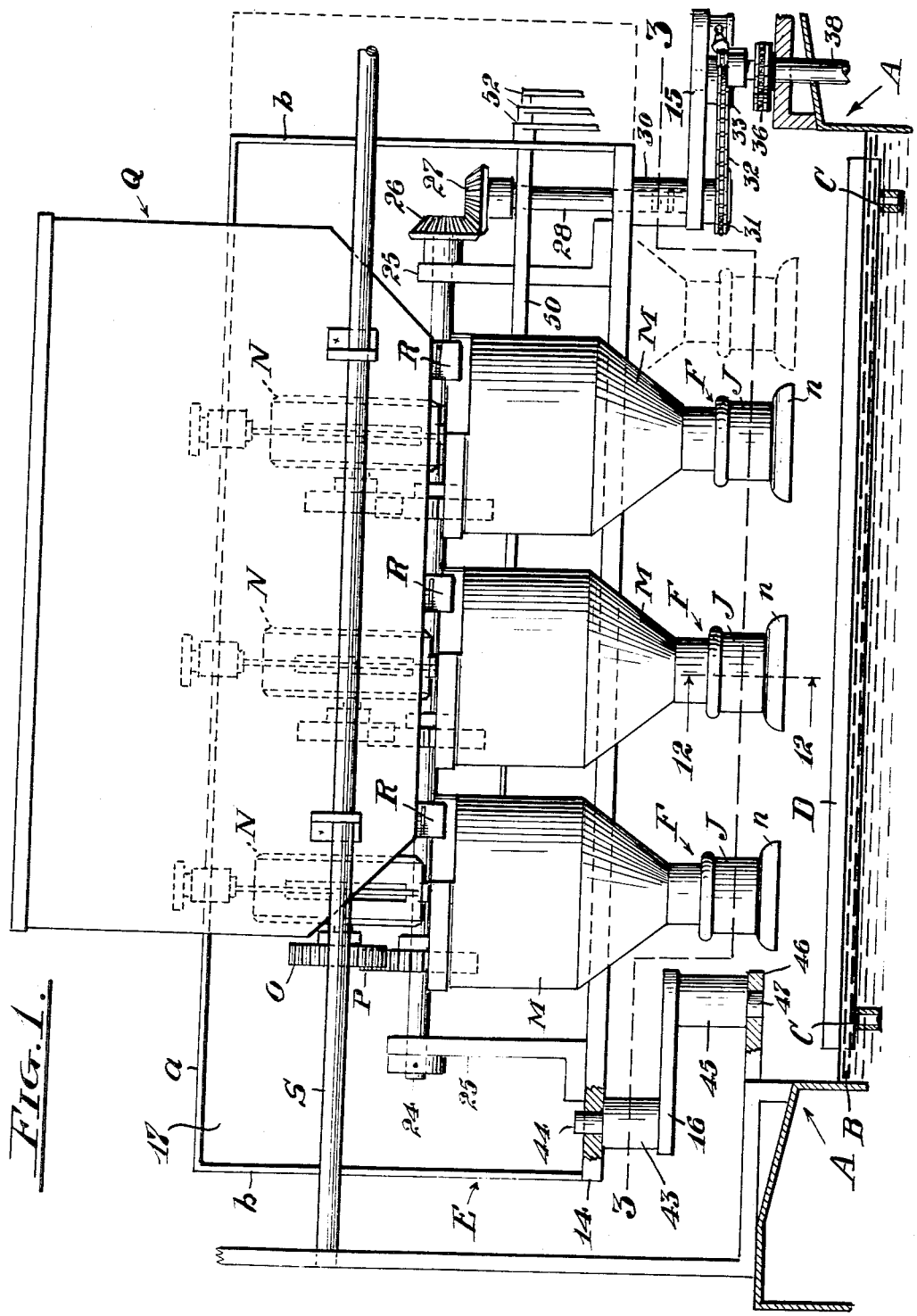

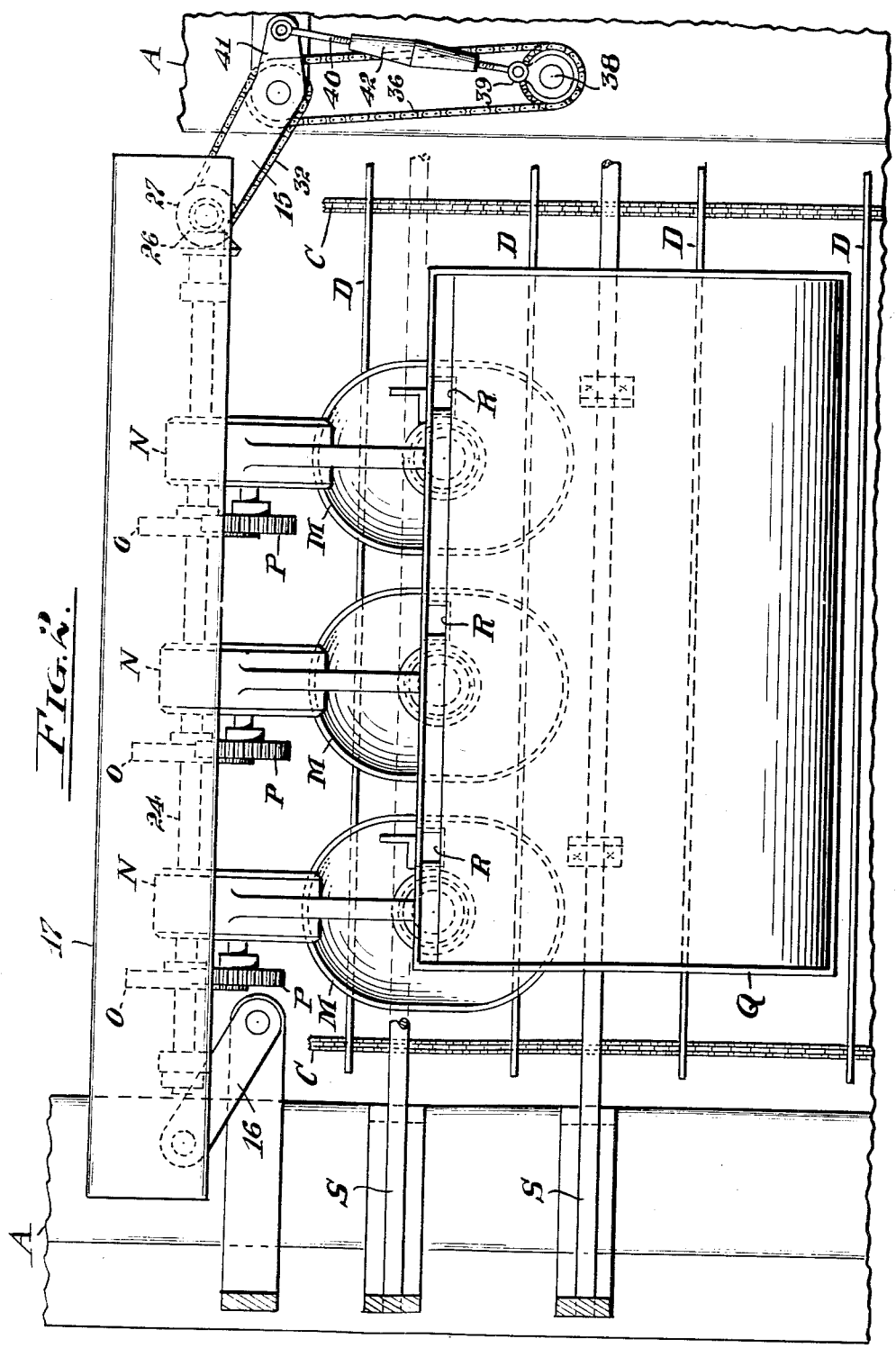

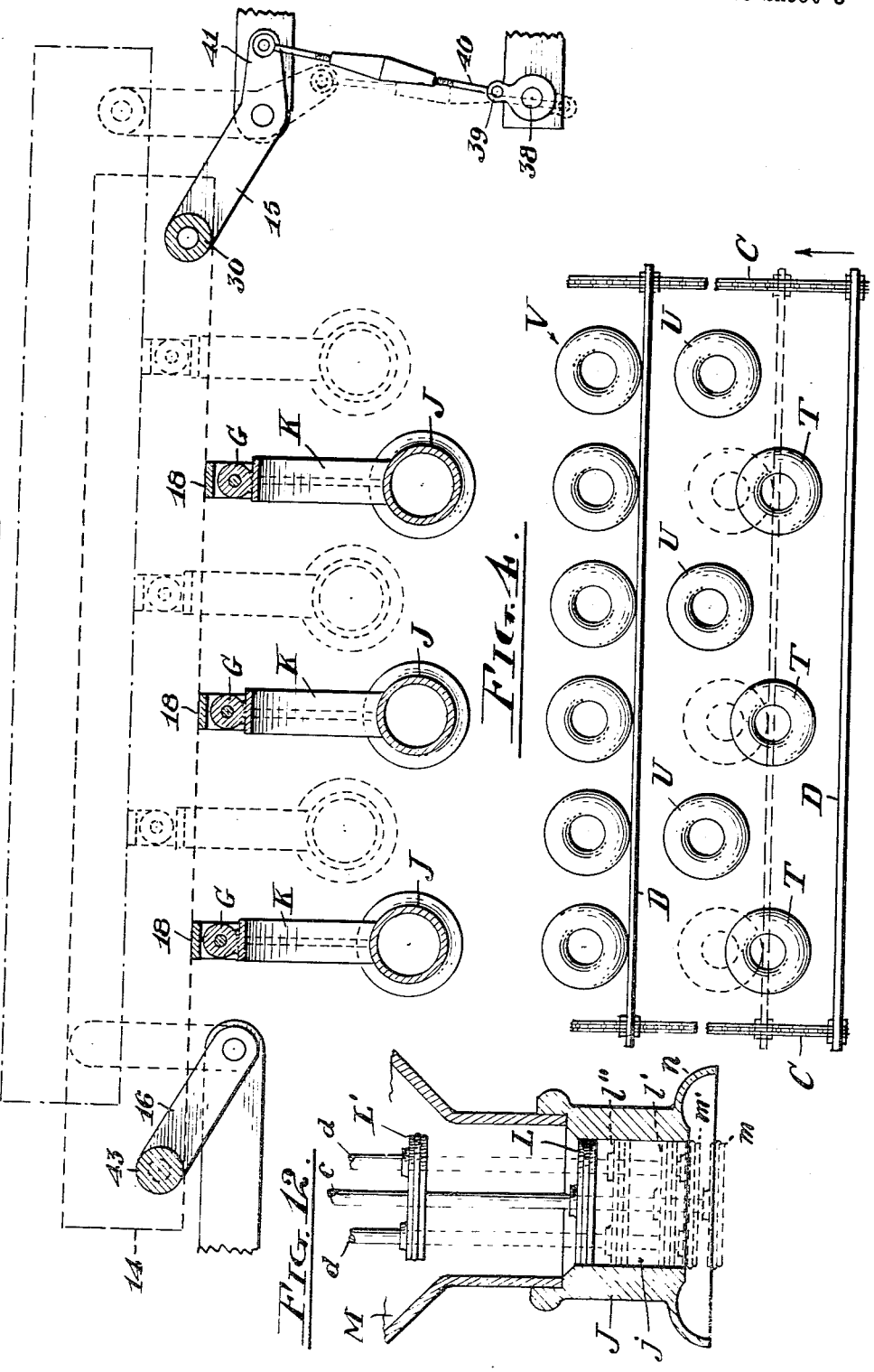

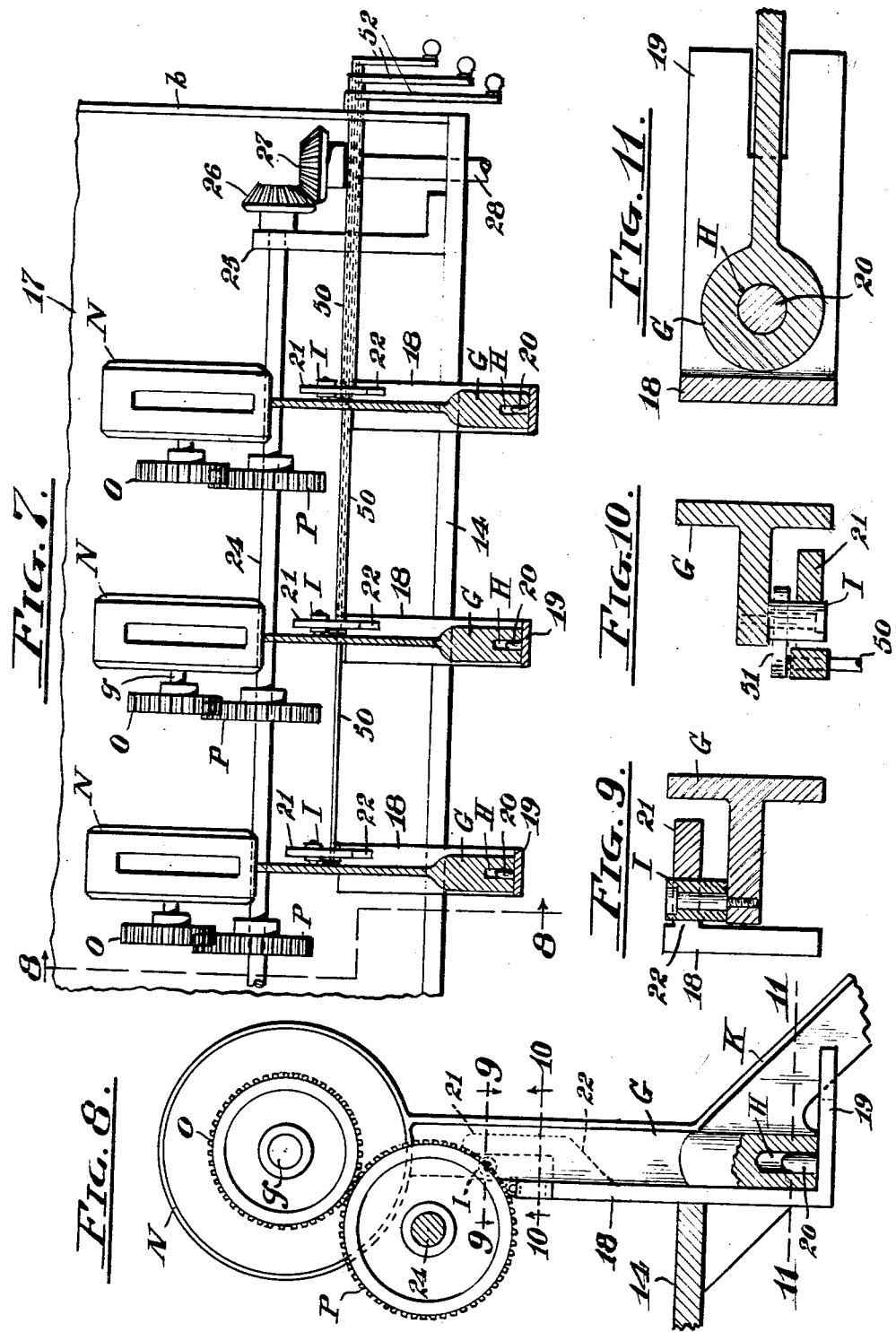

United States Patent Office 2,931,289
Patented Apr. 5, 1960

2,931,289

DOUGHNUT FRYING MACHINE

Virgil E. Ackles, Los Angeles, Calif.

Application February 18, 1957, Serial No. 640,793

6 Claims. (Cl. 99—354)

This invention relates to a doughnut frying machine of the type in which ringlets of dough are delivered to a basin of hot fat and conveyed in rows over the surface of the latter by a slatted conveyor in such fashion as to effect cooking of the dough ringlets. The invention particularly pertains to a mechanism for automatically feeding the dough ringlets to the hot fat and has as its primary object the provision of a reciprocal carrier for a plurality of conventional dough molding and delivering units whereby with a given number of such units the number of dough rings provided in a row thereof may be doubled over that of a machine employing such given number of dough molding units as heretofore generally constructed.

A particular object of the invention is to provide a mechanism whereby dough molding apparatus may be bodily reciprocated and operated in such manner as to alternately deposit molded dough bodies in back and forth offset relation so as to provide a pair of lines of dough bodies advancing over the hot fat where ordinarily with a stationary molding apparatus only a single line of the dough bodies would be produced.

Another object of the invention is to provide a mechanism of the above character whereby the alternately delivered dough bodies will be deposited on the hot fat at diagonally offset points in such fashion that the initially deposited dough bodies will be advanced from their delivered position by a conveyor blade and brought into substantial lateral alignment with the successively deposited dough bodies.

Another object is to provide a construction whereby the dough molding apparatus may be actuated from driving mechanism utilized in operating the carrier of such apparatus.

Another object is to provide a construction whereby the dough forming apparatus may be readily applied to and removed from the carrier independent of associated dough forming apparatus.

A further object is to provide means whereby any one of a plurality of the dough molding units may be thrown out of operative relation to its companion units without interfering with the operation of the latter as where some one or more of the dough molding units becomes inoperative for any reason, such as occasioned by mechanical breakdowns or fouling.

With the foregoing objects in view together with such other objects and advantages as may subsequently appear, the invention resides in the parts and in the combination, construction and arrangement of parts hereinafter described and claimed, and as illustrated by way of example in the accompanying drawing in which:

Fig. 1 is a view in front elevation of the dough feeding mechanism as positioned over a conveyor equipped fat containing tank, here shown in cross section;

Fig. 2 is a plan view of the structure shown in Fig. 1 with parts broken away;

Fig. 3 is a horizontal section and partial plan view taken on the line 3—3 of Fig. 1 and illustrating the mode of operation of the reciprocal carrier of the dough molding units;

Fig. 4 is a diagrammatic plan view depicting the manner in which the dough bodies are delivered to the surface of the hot fat and subsequently advanced thereon by a conveyor;

Fig. 7 is a detail in section and elevation taken on the line 7—7 of Fig. 5 as seen in the direction indicated by the arrows;

Fig. 8 is a view in section and end elevation with portions broken away as seen on the line 8—8 of Fig. 7;

Fig. 9 is a detail in horizontal section taken on the line 9—9 of Fig. 8;

Fig. 10 is a detail in inverted horizontal section taken on the line 10—10 of Fig. 8;

Fig. 11 is a detail in horizontal section taken on the line 11—11 of Fig. 8; and Fig. 12, Sheet 3, is a detail in vertical section as seen on the line 12—12 of Fig. 1 showing the construction and mode of operation of the dough molding and feeding unit.

Figure 5:
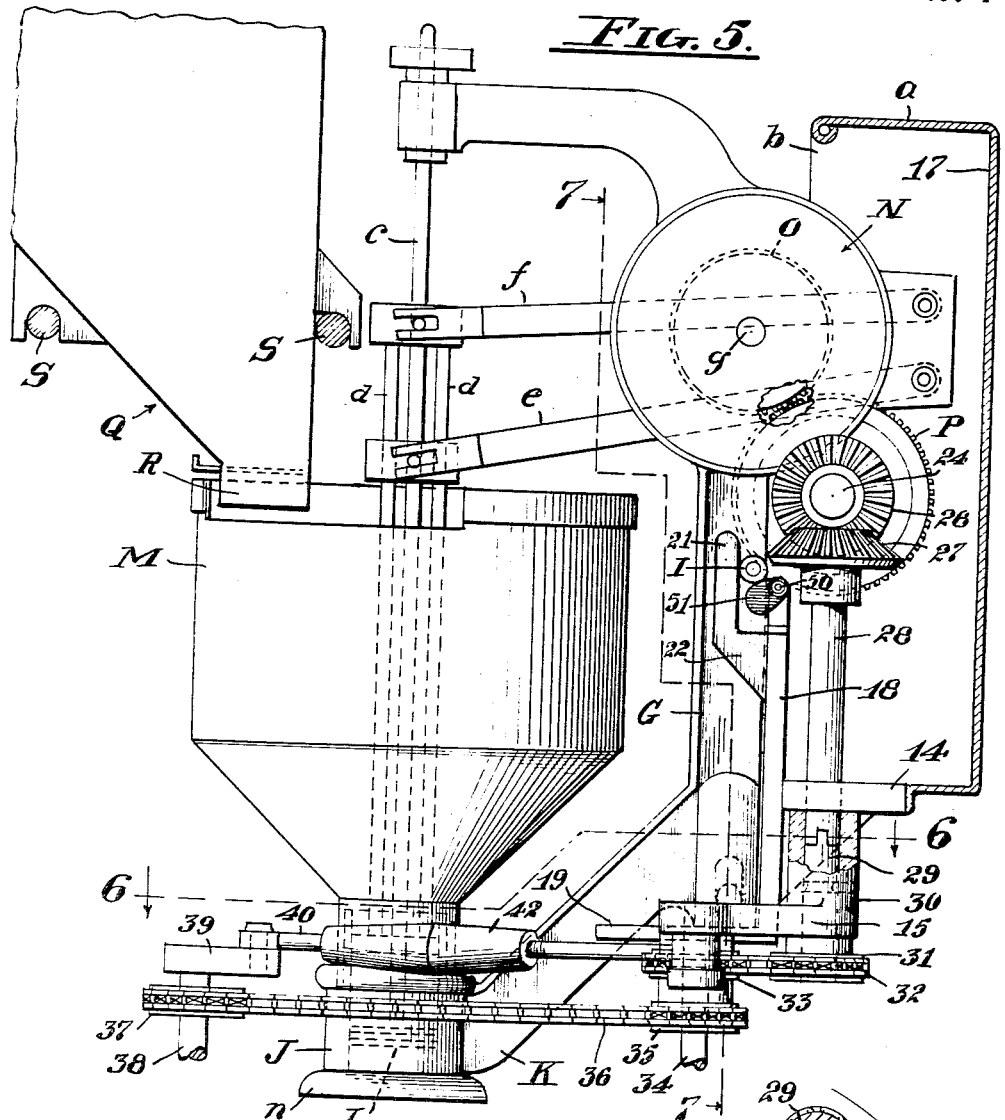
Fig. 5 is an end view of the mechanism shown in Fig. 1 with portions broken away and with the tank removed.

Referring to the drawings more specifically A—A represents the parallel side walls of a rectangular basin or tank containing a body B of cooking oil or fat which is heated in the usual manner. The tank is equipped in a conventional fashion with a pair of horizontally extending endless conveyor chains C—C extending parallel with the walls A—A and carrying a series of spaced apart transverse blades D which project upwardly from the leads of the chains C—C with their lower portion submerged in the oil body B and with their upper portions projecting above the surface of the latter. The foregoing recited construction is common in doughnut cooking machines wherein the chains C—C are operated to advance the blades D longitudinally of the tank to convey dough bodies imposed on the surface of the oil body in front of the blades so as to effect cooking of the dough bodies by the heated oil while being advanced thereover.

In carrying out the invention a carrier E is provided for a plurality of conventional dough molding units F, here shown as three in number, whereby such units are supported in a row extending transversely of the tank with the lower ends of the units presented downwardly toward the surface of the oil body B in slightly spaced relation thereto.

The carrier E embodies a horizontally extending base bar 14 which extends transversely of the tank in upwardly spaced relation thereto, which bar is mounted for longitudinal reciprocal movement on an arcuate path of travel and for which purpose has its opposite end portions pivotally supported on the outer ends of horizontally swinging arms 15—16 mounted on supports carried by the tank side walls A—A as will presently be described.

The bar 14 carries an upstanding protective back wall 17 extending upwardly from its rear and end margins which back wall terminates in a top wall *a* and forwardly extending end walls *b—b*.

Mounted on the forward edge of the bar 14 is a series of standards 18 which extend vertically above and below the bar 14 as shown in Fig. 5 and have their lower ends fitted with horizontal forwardly projecting brackets 19. The standards 18 and brackets 19 are designed to demountably receive and support the dough molding units F for vertical adjustment. Each unit F embodies a post G having a socket H on its lower end telescopically and detachably engageable with an upstanding stud 20 carried on the bracket 19 as shown in Fig. 8. The post G is fitted adjacent its upper end with a roller I, engageable with the rear edge of an upstanding finger 21 fixed on a bracket 22 projecting forwardly of and carried on the upper portion of the standard 18. The finger 21 forms a vertical guide against which the roller I bears. The lug 20 and finger 21 afford a detachable mounting for the post G and also provide guides on which the post may be shifted vertically from a seated position on the bracket 19 as will be later described.

The dough molding unit F embodying the post G is here shown as constituting a well known type of dough molding machine now generally on the market, in which the discharge end thereof comprises an annulus J which is carried on the lower end of a downwardly inclined bracket K projecting forwardly and downwardly from the lower end portion of the post G; the annulus J receiving the usual pair of dough delivering plungers L—L' and also carrying a funnel M having a discharge end which seats on the annulus J for delivering dough to the plungers L—L'. The molding unit F is actuated to cause the plungers L—L' to successively deliver dough ringlets downwardly from the discharge annulus J through the medium of operating mechanism embodying vertically reciprocal shafts c and d carrying the plungers L—L' which shafts are actuated by a pair of horizontally extending arms e and f vertically oscillated by a cam, not shown, in a housing N on the upper end of the post G the cam being operated in the usual manner from a shaft g on which it is mounted within the housing N.

The shaft g is fitted with a spur gear O which normally meshes with a companion gear P carried on a shaft 24 journalled in and supported by standards 25 erected on the base bar 14. The shaft 24 is fitted at one of its ends with a beveled gear 26 meshing with a companion gear 27 on a vertically extending shaft 28 which leads downwardly through the bar 14 and is detachably engaged with a stud shaft 29 journalled in a bearing 30 carried on the arm 15. The shaft 29 projects through the arm 15 and is fitted with a sprocket wheel 31 on its lower end engaged by a sprocket chain 32 which passes therearound and also engages a sprocket wheel 33 on a vertical shaft 34 suitably supported on the adjacent tank side wall A and which shaft 34 constitutes a pivotal mounting for the arm 15. The shaft 34 is fitted with a sprocket wheel 35 around which passes a sprocket chain 36 leading around a sprocket wheel 37 carried on a drive shaft 38 driven from any suitable source of power. The above recited gear connections afford a means for driving the operating mechanism of the dough forming units F collectively from the drive shaft 38.

Means are provided for oscillating the arm 15 from the shaft 38 which means comprises a crank 39 on the upper end of the shaft 38 to which crank is attached a connecting rod 40 leading to an arm 41 formed in continuation of the inner end portion of the arm 15. The rod 40 is in the form of turn-buckle embodying a threaded sleeve 42 having screw engagement with divided end portions of the rod 40 whereby by adjusting the sleeve 42 the length of the connecting rod 40 may be varied to vary the position of the carrier bar 14 relative to the tank side walls A—A and to the blades D.

The aforesaid mounting of the arm 15 together with the bearing 30 on the outer end of the latter affords a support for one end of the carrier bar 14, while the lower end portion of the shaft 28 extending through the bar 14 into the bearing 30 serves as a pivotal connection for one end of the bar 14. The arm 16 supporting the other end of the bar 14 has the outer end thereof fitted with a spacer 43 the upper end of which abuts the under side of the bar 14 and is provided with a pivot pin 44 pivotally engaged with the bar while the other end of the arm 16 is fitted with a spacer 45 which bears on a bracket 46 carried on the adjacent tank wall A and which spacer is fitted at its lower end with a pivot pin 47 pivotally engaging the bracket 46.

Means are provided for simultaneously supplying dough to the several funnels M while the machine is in operation whereby stopping of the machine for the purpose of filling the funnels is eliminated so as to enable long continued operation of the machine. This means comprises a stationary hopper Q having a series of discharge spouts R there being one of such spouts leading into the open upper end of each of the funnels M. The hopper Q is designed to be loaded as required while the machine is in operation to maintain a continuous supply of the dough in the funnels M. The spouts R are arranged to permit travel of the funnels M as they are carried back and forth during operation of the machine. The hopper Q may be mounted and supported in any suitable manner but in order to permit ready removal and replacement of the funnels M or the units F the hopper Q is here shown as slidably seated on a pair of parallel tracks S—S on which the hopper may be shifted clear of the hoppers or lifted clear of the machine.

Means are provided for selectively placing either of the dough forming units out of operation relative to the others without stopping operation of the machine which consists of means for elevating the several posts G independently of each other which means is here shown as comprising a series of telescoped rotary shafts 50 extending parallel with the bar 14 and mounted on suitable supports carried on the standards 18. The shafts are fitted with cams 51 extending beneath the rollers I on the posts G which cams are adapted on rotation of a shaft 50 to effect elevation of the posts G to such extent that the gear O will be lifted out of engagement with the gear P. Each of the shafts 50 is fitted with a crank 52 whereby it may be turned to effect raising or lowering of the selected dough molding unit.

In the operation of the invention, on rotating the shaft 38, which may be effected from any suitable source of power, the crank 39 will act through the connecting rod 40 to oscillate the arm 15 so that the outer end of the latter will traverse an arcuate path of travel and move the carrier bar 14 and the structure supported thereby back and forth. At the same time rotation of the shaft 38 will operate through the several sprocket wheels and chains to drive the shaft 28 and effect operation of the dough molding and feeding units F through the shaft 24 and gears O—P.

Figure 6:
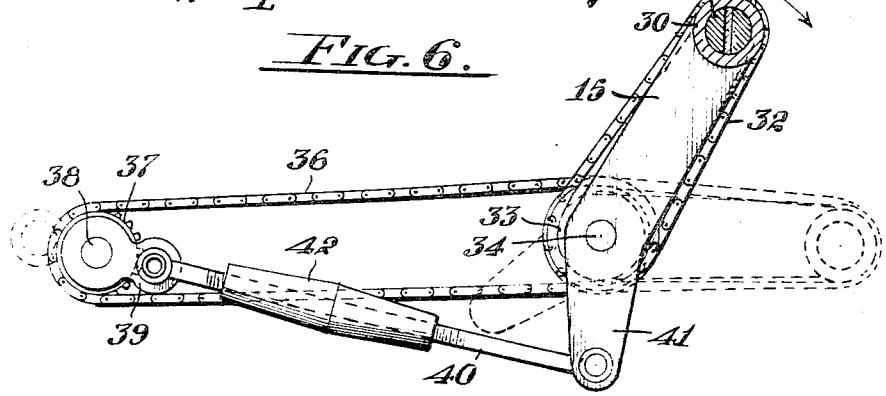
Fig. 6 is a plan view of the driving mechanism as seen substantially on the line 6—6 of Fig. 5.

The arms 15 and 16 when in their retracted positions shown in full lines in Figs. 3 and 6 extend in diagonal relation to the length of the bar 14. The arm 41 is so proportioned that on rotation of the crank 39 a half revolution the arm 15 will then extend substantially perpendicular to the bar 14 as indicated in dotted lines in Figs. 3 and 6. With the parts thus arranged, on advance of the outer end of the arm 15 from the position shown in full lines to the dotted line position of Figs. 3 and 6 the carrier bar 14 will be advanced both laterally and longitudinally with the length of travel of its lateral movement shorter than the length of travel of its longitudinal movement. In the arrangement here shown the lateral movement of the carrier bar 14 is designed to be about two and three sixteenths inches while its longitudinal movement will be approximately four inches. This movement of the carrier bar effects corresponding movement of the discharge ends J of the dough molding and dispensing units F which ends move back and forth between the positions indicated in full lines and in dotted lines in Fig. 3 wherein the full lines designate the retracted position and the dotted lines indicate the advanced and laterally offset position. Each of the dough molding and dispensing units has its operating mechanisms set and timed in the manner incident to such units to effect discharge of a ring of batter dough when in its retracted position as illustrated at T in Fig. 4 and then effect a succeeding discharge of dough in an advanced and laterally offset position as indicated at U in Fig. 4. In this manner two longitudinally extending parallel rows of dough rings are deposited on the oil body B by each unit F with the dough rings of adjacent rows initially offset relative to each other longitudinally of the rows, but are immediately brought into substantial alignment, side by side, by an advancing blade D whereby the dough rings deposited at the beginning and end of a stroke of the carrier will be conveyed in a transverse line over the oil body as indicated at V in the upper portion of Fig. 4.

While the dough molding and delivering units F here shown are old and well known in the art, and per se embody no invention, reference is had to Fig. 12 depicting the manner of operation of one of the units. In the drawing the plungers L—L' are shown in full lines as in their uppermost positions with the lower plunger L disposed at the upper end of the discharge throat j in the annulus J, while the upper plunger L' is positioned in the funnel M. When the plungers are thus disposed a body of dough feeds from the funnel into the space between the plungers which then move downwardly in the throat j with the upper plunger L' moving faster than the lower plunger L.

When both plungers are within the throat j as indicated at l'—l'' a body of dough will be confined therebetween, which body will be discharged from around the lower plunger L when the plungers pass through the lower end of the throat as indicated at m and m', the dough being thus discharged in a forming lip n from whence it falls in the form of a ring. The plungers then return to their uppermost positions in readiness for another operation, which operations are timed or set by usual adjustments (not shown) so that a dough ring will be delivered at each end of the stroke of the unit carrier E.

From the foregoing it will be seen that by employment of the invention each dough molding and delivering unit F on the carrier E will operate to produce two parallel lines of floating dough bodies instead of one as commonly practiced.

While the carrier E is here shown as fitted with three dough molding and delivering units F it is manifest that such number may be varied as occasion may require according to the size or capacity of the cooking machine to which the carrier is to be applied, and that the carrier is subject to being adapted to afford a mounting for any desired number of the units F.

As before stated the units F may be readily mounted on the carrier E and also easily removed therefrom and any of the units may be rendered inoperative by elevating it on the carrier sufficiently to separate the gears O and P.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a doughnut cooking machine, the combination with a tank for containing a body of cooking oil, said tank having parallel side walls and being equipped with a conveyor embodying blades for advancing dough bodies on the surface of the oil body; means for imposing dough bodies on the oil body in parallel rows leading longitudinally of the tank with the dough bodies of adjacent rows initially offset relative to each other longitudinally of the rows and with said offset dough bodies positioned for engagement by a conveyor blade and subsequently brought into substantially transverse alignment thereby.

2. In a doughnut cooking machine embodying a tank for containing a body of hot cooking oil and equipped with a slatted conveyor for advancing dough bodies over the surface of the oil and a dough molding and feeding unit for delivering dough bodies to the surface of the oil in position to be advanced by said conveyor; a movable carrier on which said unit is mounted, and means for horizontally rocking said carrier and the unit thereon whereby dough bodies may be delivered by said unit at the ends of the stroke of said carrier in laterally offset relation in adjacent rows thereof for subsequent lateral alignment by said conveyor, said last named means comprises a pair of horizontally swinging arms on which said carrier is mounted, a drive shaft, means for oscillating one of said arms from said drive shaft, means on said carrier for actuating said unit, and means for motivating said last named means from said drive shaft.

3. In a doughnut cooking machine embodying a cooking oil containing tank equipped with a conveyor having blades for advancing dough bodies over the surface of the oil in said tank; a movable carrier overlying said tank, means supporting said carrier operable to direct movement thereof to a horizontal arcuate path of travel diagonally of said tank, means for actuating said carrier supporting means, and a plurality of dough molding and feeding units mounted on said carrier having downwardly opening discharge ends presented toward the surface of the oil in said tank and arranged to deliver dough bodies in front of said conveyor blades at the ends of the path of travel of said carrier.

4. In a dough body feeding mechanism, a plurality of dough molding and delivering units, a carrier on which said units are mounted, horizontally swinging arms on which said carrier is mounted, means for oscillating one of said arms and thereby swinging said carrier, a stud shaft carried by said last named arm, means for driving said stud shaft, a rotary shaft carried by said carrier, means for driving said shaft from said stud shaft and driving connections between said shaft and said units for actuating said units.

5. The structure called for in claim 4 together with means for independently disengaging the driving connections between each of said units and said actuating shaft.

6. In a dough body feeding mechanism, a plurality of dough molding and delivering units each including a post having a socket in its lower end, a carrier bar, standards on said carrier bar, a bracket on each of said standards, a stud on said bracket engageable in said socket, means on each of said posts and standards slidably interengaging a standard and post when said stud is engaged in a socket, driving mechanism carried by said carrier for motivating said units, and means operable by elevating the posts of said units relative to said standards for disengaging the driving mechanism of the unit embodying the elevated post.

References Cited in the file of this patent

UNITED STATES PATENTS

| | | |
|---|---|---|
| 2,083,829 | Carpenter | June 15, 1937 |
| 2,140,282 | Drake | Dec. 13, 1938 |
| 2,229,167 | Carpenter | Jan. 21, 1941 |